| (12) | United States Patent | (10) Patent No.: | US 10,645,188 B1 |
|---|---|---|---|
| | Mahapatra et al. | (45) Date of Patent: | May 5, 2020 |

(54) SYSTEM FOR PREPARING A DEVICE FOR OFFLINE OR LOW-BANDWIDTH USE

(71) Applicant: AMAZON TECHNOLOGIES, INC., Seattle, WA (US)

(72) Inventors: Abinash Mahapatra, Cupertino, CA (US); Paul Andrew Mietz Egli, Santa Cruz, CA (US); Joseph Gregory Muoio, Santa Cruz, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 234 days.

(21) Appl. No.: 15/841,804

(22) Filed: Dec. 14, 2017

(51) Int. Cl.
*G06F 15/16* (2006.01)
*H04L 29/08* (2006.01)
*H04W 4/02* (2018.01)

(52) U.S. Cl.
CPC ......... *H04L 67/2847* (2013.01); *H04W 4/027* (2013.01)

(58) Field of Classification Search
CPC .......................... H04L 67/2847; H04W 4/027
See application file for complete search history.

(56) References Cited

U.S. PATENT DOCUMENTS

| 2001/0051927 | A1* | 12/2001 | London | H04L 29/06 |
| | | | | 705/51 |
| 2002/0078142 | A1* | 6/2002 | Moore | G06F 8/658 |
| | | | | 709/203 |
| 2002/0138565 | A1* | 9/2002 | Kustov | H04L 29/06 |
| | | | | 709/203 |
| 2009/0187654 | A1* | 7/2009 | Raja | H04L 63/0272 |
| | | | | 709/224 |
| 2011/0277027 | A1* | 11/2011 | Hayton | H04L 63/0815 |
| | | | | 726/8 |
| 2016/0226972 | A1* | 8/2016 | Mahankali | G06F 12/0238 |
| 2016/0261705 | A1* | 9/2016 | Lewandowski | H04L 67/2857 |
| 2017/0324833 | A1* | 11/2017 | Douros | H04N 7/185 |
| 2019/0265348 | A1* | 8/2019 | Bengtsson | G01S 13/86 |

* cited by examiner

*Primary Examiner* — Richard G Keehn
(74) *Attorney, Agent, or Firm* — Lindauer Law, PLLC (57) ABSTRACT

Techniques for preparing a user device for use in a location having limited network access include replacing data in the device cache prior to the user device reaching the location. A length of time until cached data expires, a length of time used to replace the cached data, and a length of time for the user device to reach the location are determined. Portions of the cached data that will expire while the user device is within the location are replaced. The time at which the data is replaced is based on the length of time used to replace the data and the length of time for the user device to reach the location. While the user device is in the location, functions that transmit large quantities of data may instead be replaced with more efficient data types or queued for later execution after the user device exits the location.

21 Claims, 5 Drawing Sheets

SYSTEM FOR PREPARING A DEVICE FOR OFFLINE OR LOW-BANDWIDTH USE

BACKGROUND

Many applications may communicate with a network to send and receive data to perform various functions. During times when network access is limited or unavailable, the use of certain applications or functions may be limited.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many applications executing on a user device may cause the user device to exchange data via a network. For example, an application may cause the user device to request data from a server or other external computing device and store the received data in a cache. Subsequently, when the user device executes the application, at least a portion of the output produced by the user device may be generated using the cached data. When the user device is in communication with a network, the data in the cache may be periodically updated. For example, cached data may be associated with an expiration time, and on or before the expiration time, the user device may request data from the external computing device, which may be received and used to replace the expiring cached data. In other cases, commands received by the user device or output generated by the user device may use external data received via the network rather than data stored in the cache. When the user device is unable to access a network, such as when entering a remote location where communication with a network is not possible, updating data in the cache and executing commands that use external data may not be possible. During such times, the functions of the user device may be limited to use of data that is currently within the cache, and in some cases, at least a portion of the cached data may expire before the user device is able to access the network. In other cases, a user device may enter a location where the available bandwidth associated with the network is reduced, though the network is not wholly inaccessible. In such cases, attempts to transmit large quantities of data or execute commands that utilize large quantities of bandwidth may result in significant latency. In still other cases, a user device may enter a location associated with an untrusted network or computing device, or a location that lacks particular security features or may be suspected of being insecure or compromised. In such cases, while the network may be accessible, use of the user device to send or receive private, sensitive, or confidential data may be undesirable or restricted.

Described in this disclosure are techniques to prepare a user device for use during times when a network is inaccessible, use of a network is undesirable, or the available bandwidth associated with a network is limited. For example, locations associated with reduced bandwidth, reduced security, or that are inaccessible to a network may be determined based on data provided from a service carrier. Data associated with reduced bandwidth or network inaccessibility may be based on actual measurement of bandwidth available at particular locations or based on radio propagation models or other types of models. Continuing the example, an internet service provider may provide a map or other types of data indicative of particular locations that are inaccessible to the network or associated with quantities of bandwidth below a threshold amount. As another example, locations associated with network inaccessibility or reduced network bandwidth may be determined by the user device. For example, as a user device moves to various locations, the user device may determine a current location and the availability of network access or the quantity of available network bandwidth at that location. Over time, the data determined by the user device may indicate one or more locations associated with network inaccessibility or reduced bandwidth. As yet another example, locations associated with network inaccessibility or reduced network bandwidth may be determined by multiple user devices. For example, as different users travel to various locations, data indicative of the available bandwidth and network accessibility at those locations may be collected from multiple user devices, stored in a server or other centralized computing device, and distributed to one or more of the user devices for use.

A location of a user device relative to the location of an area associated with network inaccessibility, reduced bandwidth, or reduced security may be determined. For example, the current location of a user device may be determined using a terrestrial or satellite-based navigational system, such as a Global Positioning System (GPS) receiver, a Global Navigation Satellite System (GLONASS) receiver, a Galileo receiver, a BeiDou Navigation Satellite System (BDS) receiver, an Indian Regional Navigational Satellite System, and so forth. The current location of the user device may be compared with the locations of the areas associated with reduced network access to determine whether the user device is within a threshold distance of such an area. In some implementations, based on movement of the user device, a length of time for the user device to reach an area associated with reduced network access may be determined, and this length of time may be compared to a threshold length of time.

If it is determined that the user device is within a threshold distance of a location associated with reduced network access or that the user device will reach such a location within a threshold length of time, the user device may be caused to replace at least a portion of the data stored within the user device cache. For example, the location associated with reduced network access may include an isolated portion of a freeway, an airport, a warehouse, or a basement beneath a residence, and the user device may be caused to replace cached data once the user device is within 100 yards of the location such that when the user device reaches the location, at least a portion of the cache includes recently-received data that will not expire in the near future. As another example, the threshold length of time may include a length of time until particular data within the user device cache expires or is used or consumed. The user device may be caused to replace data within the cache if the length of time until the user device reaches a location associated with reduced network access is within a threshold length of the length of time until data in the cache expires, such that data in the cache that is close to expiration is replaced prior to entering a location associated with reduced network access. Replacement of this data prior to arrival of the user device at the location may prevent expiration of the cached data during a time that network access is unavailable or limited and replacement of expired data may not be possible.

In some implementations, the particular data that is replaced in the user device cache may be determined based on the expiration time of the data. For example, data associated with an expiration time that occurs prior to a threshold time may be replaced prior to other data in the cache, or may be replaced while other data in the cache is not replaced. In some cases, the threshold time may be determined based on a length of time that a user device is expected to remain within the location associated with reduced network access. For example, based on the movement of the user device, a length of time that may elapse before the user device passes through the location may be determined. Data in the cache having an expiration time included within this length of time may be replaced prior to other data in the cache, or other data in the cache may not necessarily be replaced. In other cases, data in the cache may be updated continuously while the user device is within a threshold distance or threshold time of the location. For example, the expiration times of the data in the cache may be determined, and the data may progressively be replaced beginning with the data having the earliest expiration time until access to the network is no longer present.

In other implementations, the particular data that is replaced in the cache may be determined based on usage data indicative of one or more of the counts of accesses, frequency of access, or length of time that the particular data is accessed. Data that is used or accessed more frequently may be replaced prior to data that is used or accessed less frequently, or data that is used less frequently may not necessarily be replaced. In some implementations, data associated with an application that is currently executing may be replaced prior to data associated with other applications. In other implementations, data that is related to previously-accessed data may be received and added to the cache independent of whether the cache currently includes a version of the related data. For example, if usage data indicates that a user has historically accessed a particular type of data related to a first type of data, then the particular data related to the cached data may also be received prior to the user device reaching an area associated with limited bandwidth.

In addition to the replacement of cached data prior to arrival of the user device at a location associated with reduced network access, the functions of the user device may be limited while the user device is within the location. For example, certain types of commands (e.g., commands that match a threshold command type) may be disabled while a device is within a location associated with reduced bandwidth. As another example, while a user device is within an area associated with limited bandwidth, the user device may send and receive data associated with an amount of bandwidth less than a threshold quantity. Continuing the example, the user device may transmit low resolution image data in place of video data or high-resolution image data, text in place of image data, e-mail headers in place of e-mail, and so forth. As another example, while a user device is within an area associated with limited bandwidth, the user device may be permitted to perform commands that use data within the user device cache, but prevented from performing commands that use a quantity of data received via the network that exceeds a threshold quantity. In some implementations, a user device may be configured to transmit a different type of data while within a location associated with limited bandwidth than when outside of such a location. For example, a user device may be configured to transmit alphanumeric data rather than image data when within a location associated with limited bandwidth.

In some implementations, if a command is received from a user device that uses a quantity of data from the network in excess of the available bandwidth, the command may be added to a queue. When the user device exits the location associated with reduced network access, the commands in the queue may then be executed using data received via the network. In some implementations, user input that confirms the particular commands that are to be executed may be received. In other implementations, extraneous or redundant commands included in the queue may be deleted prior to executing the commands. For example, if two commands modify the same data record, the earlier command may be discarded due to the modification of the data record by the later command.

Figure 1:
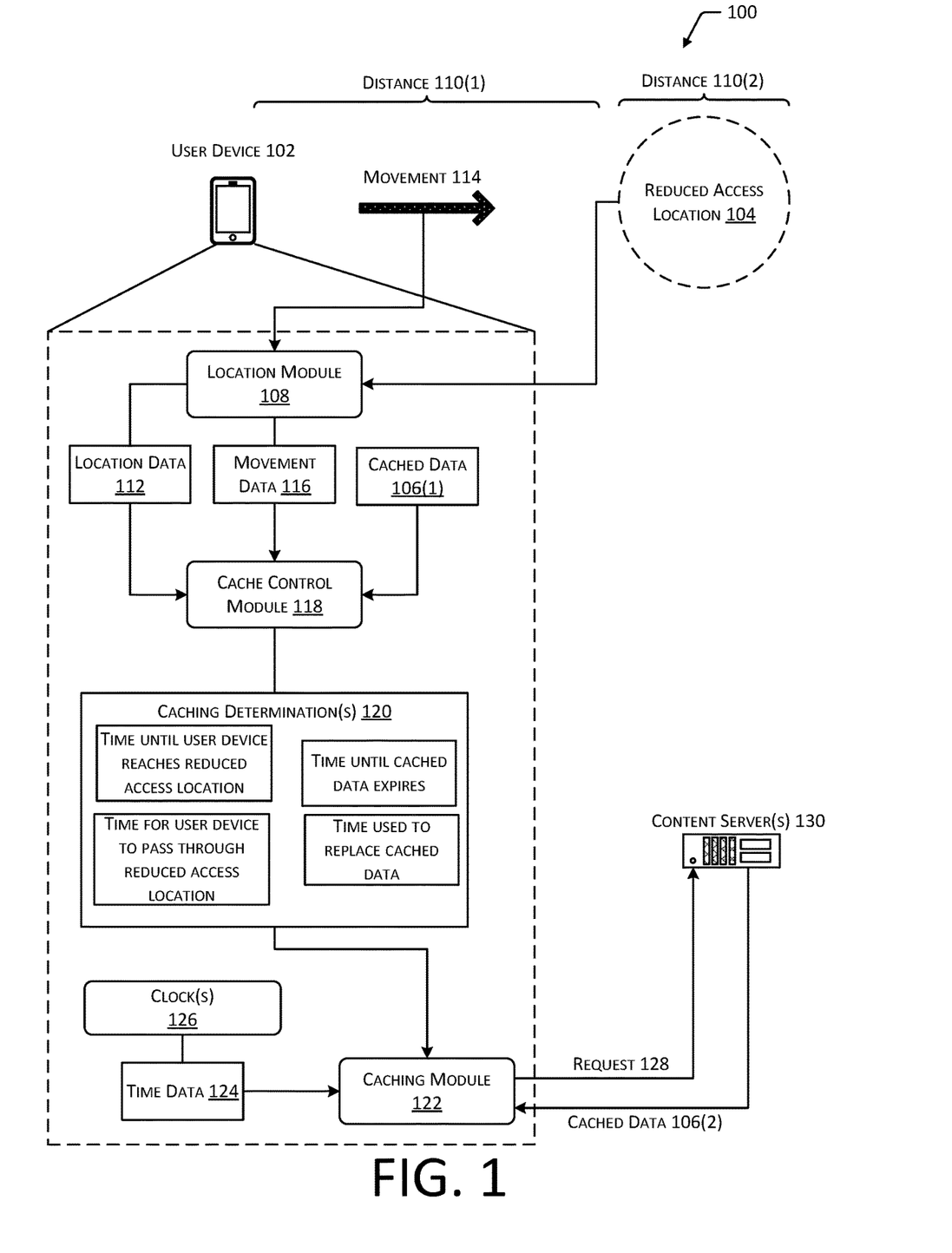
FIG. 1 depicts an implementation of a system for determining the location of a user device relative to a reduced access location and updating cached data associated with the user device based on the location.

FIG. 1 depicts an implementation of a system 100 for determining the location of a user device 102 relative to a reduced access location 104 and updating cached data 106 associated with the user device 102 based on the location. While FIG. 1 depicts the user device 102 as a portable computing device, such as a cellular telephone, a user device 102 may include any type of computing device including, without limitation, personal computers (e.g., desktop or laptop computers), portable computing devices (e.g., smartphones, notebooks, tablet computers, palm-top computers), wearable computing devices, automotive computing devices, gaming systems, smart televisions, set-top boxes, servers, and so forth. Additionally, while FIG. 1 depicts a single user device 102, the user device 102 may include any number and any type of computing device(s), such as a distributed network of computing devices. The user device 102 may be configured to communicate using one or more local area networks or wide area networks, including, without limitation, one or more Wi-Fi, Bluetooth, ZigBee, 3G, 4G, LTE, or other types of networks.

The reduced access location 104 may include a geographic region from which the network may be inaccessible while the user device 102 is located within. For example, the reduced access location 104 may include a remote location that is out of range of any computing devices associated with the network. In other implementations, the reduced access location 104 may include a geographic region associated with a lower quantity of bandwidth or data throughput, a higher quantity of latency, and so forth, that may limit or prevent use of the network to transmit large quantities of data. For example, the reduced access location 104 may include a region that is located near the maximum range of one or more computing devices associated with the network, that is enclosed by one or more solid objects that hinder the ability to transmit data, or that is associated with other networks or computing devices that may generate interference that affects use of the network. In still other implementations, the reduced access location 104 may include a location or computing device that is unknown or untrusted by the network or user device 102 or that lacks one or more security features, such as encryption or access controls. While the network may be accessible while the user device 102 is within such a reduced access location 104, use of the user device 102 to access or transmit certain types of data or to perform certain functions may be restricted, effectively mimicking a region that is inaccessible to the network with regard to those types of data or functions.

A location module 108 associated with the user device 102, or with another computing device in communication with the user device 102, may determine the location of the user device 102 and the location of the reduced access location 104. Based on the location of the user device 102 relative to the reduced access location 104, a distance 110(1) between the user device 102 and the reduced access location 104 may be determined. In some implementations, rather than determining a distance 110(1), the location module 108 may determine relative locations of the user device 102 and reduced access location 104. The location module 108 may generate location data 112 indicative of one or more of the location of the user device 102, the location of the reduced access location 104, or the distance 110(1). In some implementations, data regarding the reduced access location 104 may also be known and stored in association with the user device 102 as location data 112. For example, location data 112 may include one or more dimensions of the reduced access location 104, such as a distance 110(2) across the reduced access location 104.

The location module 108 may also determine movement 114 of the user device 102. For example, the location module 108 may determine the movement 114 and generate movement data 116 indicative thereof using one or more motion sensors, gyroscopes, accelerometers, location sensors, and so forth. Continuing the example, the movement data 116 may indicate a speed and direction of the user device 102, such as a velocity of the user device 102 in a direction toward the reduced access location 104. In other implementations, the movement data 116 may instead be based on the location of the user device 102. For example, as the location of the user device 102 changes relative to the reduced access location 104, the movement data 116 may indicate the rate of change of the location or the distance 110(1).

A cache control module 118 associated with the user device 102, or another computing device in communication with the user device 102, may generate one or more caching determinations 120 based on one or more of the location data 112, movement data 116, or cached data 106(1) that is stored in association with the user device 102. For example, based on the movement data 116 indicative of the movement 114 of the user device 102 toward the reduced access location 104 and the distance 110(1) between the user device 102 and the reduced access location 104, the cache control module 118 may generate a caching determination 120 indicative of a length of time for the user device 102 to reach the reduced access location 104. Based on the type or quantity of cached data 106(1), the cache control module 118 may generate a caching determination 120 indicative of a length of time until at least a portion of the cached data 106(1) expires, as well as a caching determination 120 indicative of a length of time used to replace the cached data 106(1). Additionally, based on the movement data 116 and the distance 110(2) across the reduced access location 104, the cache control module 118 may generate a caching determination 120 indicative of a length of time for the user device 102 to pass through the reduced access location 104.

Based on one or more of the caching determinations 120, one or more portions of the cached data 106(1) may be replaced at particular times. For example, a caching module 122 associated with the user device 102 may determine time data 124 indicative of the current time or one or more lengths of time using one or more clocks 126. Based on the caching determination(s) 120, the caching module 122 may determine portions of the cached data 106(1) that may expire while the user device 102 is within the reduced access location 104. For example, cached data 106(1) having an expiration time that occurs after the length of time for the user device 102 to reach the reduced access location 104 but before the length of time for the user device to pass through the reduced access location 104 may expire while the user device 102 is within the reduced access location 104. Based on the caching determination 120 indicative of the length of time used to replace that portion of the cached data 106(1), the caching module 122 may cause the user device 102 to replace the portion of the cached data 106(1) when the length of time for the user device 102 to reach the reduced access location 104 is greater than or equal to the length of time used to replace the cached data 106(1). For example, the user device 102 may provide a request 128 for additional cached data 106(2) to one or more content servers 130. The content server(s) 130 may provide the cached data 106(2) responsive to the request 128. While FIG. 1 depicts a single content server 130, the content server(s) 130 may include any number and any type of computing devices, including without limitation the types of computing devices described with regard to the user device 102.

Figure 2:
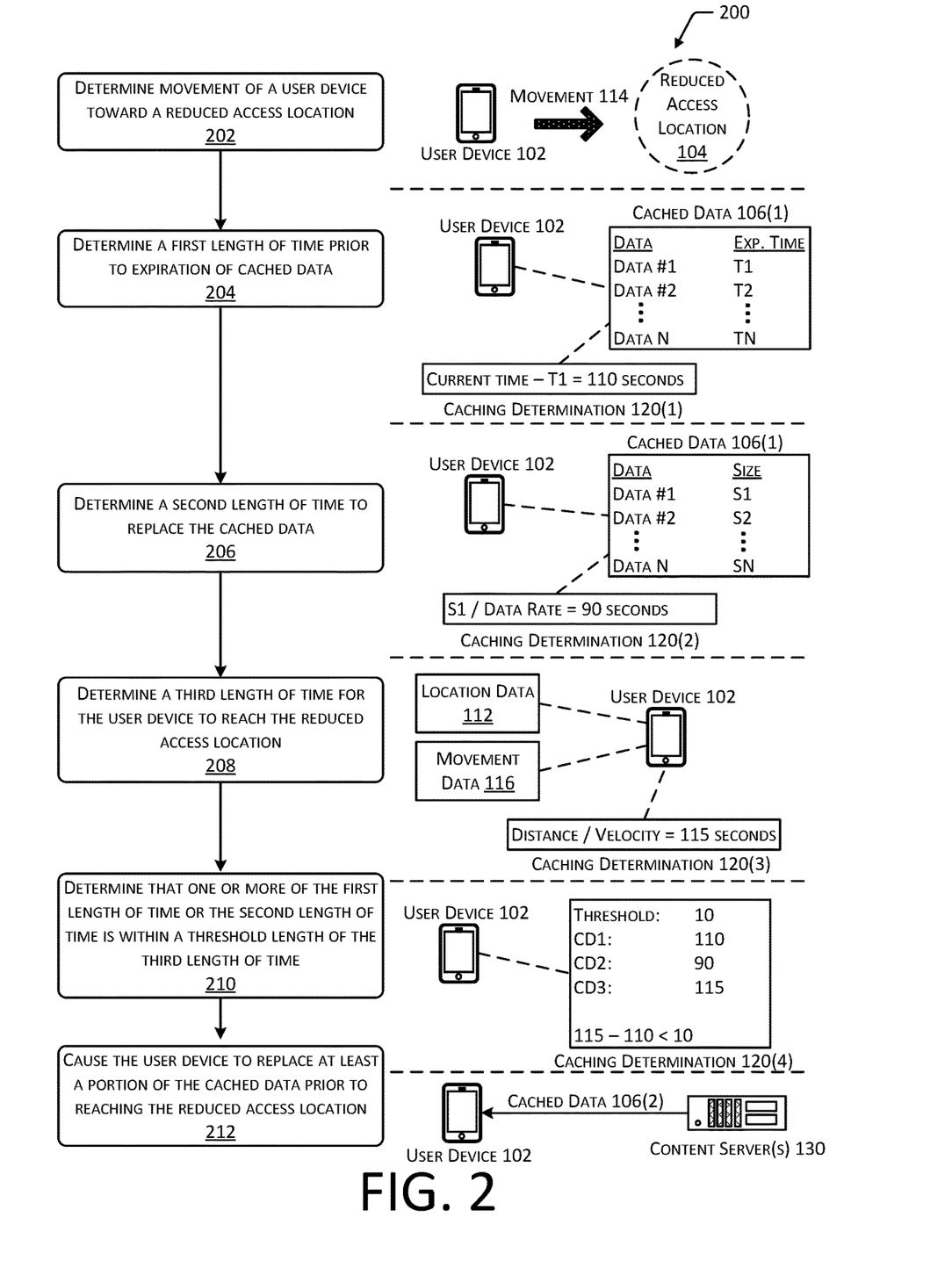
FIG. 2 is a flow diagram illustrating a method for updating cached data responsive to the location of a user device relative to a reduced access location.

FIG. 2 is a flow diagram 200 illustrating a method for updating cached data 106 responsive to the location of a user device 102 relative to a reduced access location 104. At 202, movement 114 of a user device 102 toward a reduced access location 104 may be determined. For example, the user device 102 or another computing device in communication with the user device 102 may determine movement 114 of the user device 102 using one or more motions sensors, accelerometers, and so forth. As another example, movement 114 of the user device 102 may be determined based on a change in location of the user device 102, such as by determining a rate of change of a location using a GPS receiver or other type of location sensor. In some implementations, the determined movement 114 may include a direction and speed of the user device 102. In other implementations, the determined movement 114 may include a rate of change of a distance 110 between the user device 102 and the reduced access location 104. In still other implementations, in lieu of determining movement 114 of the user device 102, a location of the user device 102 relative to the reduced access location 104 may be determined.

At 204, a first length of time prior to expiration of cached data 106 associated with the user device 102 may be determined. For example, different portions of the cached data 106 may each be associated with respective expiration times. Based on the difference between a current time, which may be determined using one or more clocks 126 associated with the user device 102 or another computing device, and the expiration time(s) for one or more portions of cached data 106, one or more lengths of time before the expiration of different portions of the cached data 106 may be determined.

At 206, a second length of time to replace the cached data 106 may be determined. For example, a current or average data transfer rate associated with communication between the user device 102 and another computing device, such as a content server 130 may be determined. The data size of one or more portions of the cached data 106 may also be determined. In some implementations, the portion(s) of the cached data 106 for which the data size is determined may be based on historical usage patterns associated with the user device 102, a user account associated with the user device 102, or a type or category associated with the user device 102 or user account. For example, a user may historically use a first application more frequently than a second application. Responsive to this determination, the data size of cached data 106 used by the first application may be determined in preparation for replacement of this portion of the cached data 106 prior to entry of the user device 102 into a reduced access location 104. Based on the data transfer rate and the determined data size(s), the lengths of time that would be used to replace one or more portions of the cached data 106 may be determined.

At 208, a third length of time for the user device 102 to reach the reduced access location 104 may be determined. For example, based on the location of the user device 102 and that of the reduced access location 104, a distance 110 between the user device 102 and reduced access location 104 may be determined. Based on the movement 114 of the user device 102 relative to the reduced access location 104, a length of time for the user device 102 to reach the reduced access location 104, such as a length of time before the distance 110 reaches a value of zero, may be determined. In other implementations, the length of time for the user device 102 to reach the reduced access location 104 may be determined based on other data. For example, a location history for the user device 102 may indicate that the user device 102 enters a reduced access location 104 each weekday at approximately 6:30 P.M. Based on the location history, the third length of time may include the length of time between the current time and 6:30 P.M. As another example, calendar data for the user device 102 may indicate a scheduled flight or another scheduled event during which the user device 102 may be located in an aircraft or other reduced access location 104. The third length of time may include the length of time between the current time and the time of the scheduled event.

At 210, a determination may be made that one or more of the first length of time or the second length of time is within a threshold length of the third length of time. For example, as a user device 102 moves closer to a reduced access location 104, the length of time until the user device 102 reaches the reduced access location 104 may decrease. If the length of time used to replace the cached data 106 were to become less than the length of time until the user device 102 reaches the reduced access location 104, it may not be possible to replace the cached data 106 prior to the user device 102 losing access to the network. As another example, if the expiration time of the cached data 106 coincides with a time after which the user device 102 reaches the reduced access location 104, the cached data 106 may expire while the user device 102 does not have access to the network. Therefore, when one or more of the first length of time or the second length of time is within a threshold length of the third length of time, the cached data 106 may be updated prior to the user device 102 reaching the reduced access location 104.

At 212, the user device 102 may be caused to replace at least a portion of the cached data 106 prior to reaching the reduced access location 104. For example, as described with regard to FIG. 1, the user device 102 may provide a request 128 to one or more content servers 130 which may provide cached data 106 responsive to the request 128. In some implementations, the particular portions of the cached data 106 that are replaced may be selected based on the expiration times of the cached data 106. For example, a user device 102 may request and replace only portions of the cached data 106 that will expire while the user device 102 is within the reduced access location 104. In other cases, the user device 102 may prioritize the replacement of cached data 106 having more recent expiration times over the replacement of cached data 106 having later expiration times. For example, the user device 102 may sequentially replace cached data 106 beginning with the cached data 106 having the earliest expiration time and progressing to cached data 106 having later expiration times. In other implementations, usage data associated with the user device 102 may indicate particular portions of the cached data 106 that are used more frequently than other portions. In such cases, the user device 102 may replace only portions of the cached data 106 having a certain threshold of use or may prioritize replacement of cached data 106 that is used more frequently prior to replacement of cached data 106 that is used less frequently.

Figure 3:
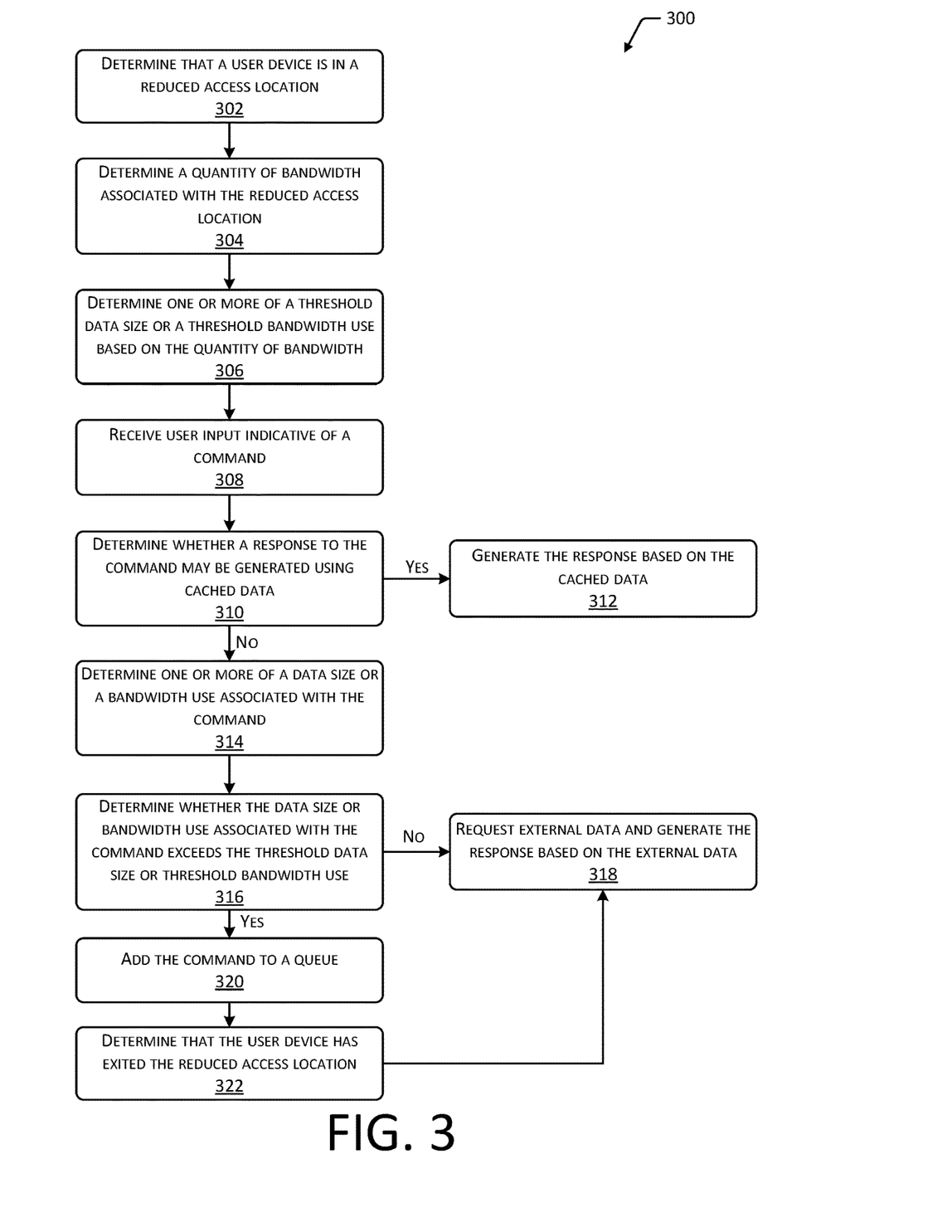
FIG. 3 is a flow diagram illustrating a method for controlling the functions of a user device based on the bandwidth associated with a reduced access location.

FIG. 3 is a flow diagram 300 illustrating a method for controlling the functions of a user device 102 based on the bandwidth associated with a reduced access location 104. At 302, a user device 102 may be determined to be in a reduced access location 104. For example, as described with regard to FIG. 1, the location of the user device 102 may be determined using a GPS receiver or other type of location sensor, while the location of one or more reduced access locations 104 may be stored as location data 112. If the user device 102 is determined to be within a threshold distance of a reduced access location 104, one or more functions of the user device 102 may be controlled based on the characteristics of the user device 102 or of the reduced access location 104.

At 304, a quantity of bandwidth associated with the reduced access location 104 may be determined. The quantity of bandwidth may include a data throughput value, a latency measurement, an error rate, a physical data rate, or other metrics that may indicate the speed or reliability of data transferred to and from devices within the reduced access location 104. For example, a reduced access location 104 may include a location having a lower data transfer rate than other locations external to the reduced access location 104.

At 306, one or more of a threshold data size or a threshold bandwidth use may be determined based on the quantity of bandwidth associated with the reduced access location 104. For example, based on a data transfer rate, data throughput value, or other metric indicative of the speed or reliability of data transfer within the reduced access location 104, a maximum data size for a data transmission, a maximum total quantity of data, or a maximum data transfer rate may be determined. Continuing the example, a maximum value may be based on a percentage of the maximum bandwidth associated with the network. In other cases, the maximum value may include a fixed threshold value. In some implementations, the threshold data size or bandwidth use may be determined based on a table or other type of data structure that associates threshold values with current data transfer rates of the network.

At 308, user input indicative of a command may be received. For example, while the user device 102 is within the reduced access location 104, the user device 102 may attempt to access or modify a stored value or other type of data record. Typically, responsive to the command, cached data 106 associated with the user device 102 or external data associated with one or more content servers 130 may be received and used to generate a response to the command.

At 310, a determination may be made as to whether a response to the command may be generated using cached data 106. For example, in some cases, cached data 106 stored in association with the user device 102 may be sufficient to generate output responsive to a command without accessing external data via a network. In such a case, at 312, a response to the command may be generated based on the cached data 106.

In cases where the cached data 106 is not useable to generate a response to the command, at 314, one or more of a data size or a bandwidth use associated with the command may be determined. For example, execution of a particular command may include requesting and receiving a particular quantity of data from one or more content servers 130 or other external computing devices. As another example, execution of a particular command may use a particular data transfer rate, such as by streaming audio data or video data.

At 316, a determination may be made as to whether the data size or the bandwidth use associated with the command exceeds the threshold data size or threshold bandwidth use determined at 306. In some implementations, the threshold data size or threshold bandwidth use may be determined based on one or more functions, code, or rules. For example, a server or other computing device may provide a user device 102 with code that the user device 102 may execute (e.g., in a secure module). The specific code provided to the user device 102 may be determined based on signals received from the user device 102, such as signals indicative of the location or movement of the user device 102 or signals indicative of characteristics of the cached data 106 associated with the user device 102.

If the data size or bandwidth use associated with the command does not exceed the threshold value, then at 318, external data may be requested and the response to the command may be generated based on the external data. In cases where the data size or bandwidth use associated with the command exceeds the threshold value, at 320, the command may be added to a queue. In some implementations, the user device may output a notification indicating that the command has been added to the queue for future execution when the user device 102 is no longer within the reduced access location 104. In some cases, when the command is added to the queue, one or more existing commands in the queue may be modified if the command that is added supersedes an existing command. For example, if a first command in the queue changes the value of a data record to a first value, and a subsequent command changes the value of the data record to a second value, the first command may be removed from the queue when the second command is added. In other implementations, commands may be added to the queue without modifying existing commands, and when the user device 102 exits the reduced access location 104, the commands may be sequentially executed. In still other implementations, when the user device 102 exits the reduced access location 104, user input indicating the particular commands in the queue to be executed may be requested.

At 322, it may be determined that the user device 102 has exited the reduced access location 104. For example, the location of the user device 102 may be determined using a GPS receiver or other type of location sensor, and the location may be determined to be beyond a threshold distance from one or more reduced access locations 104. Subsequent to determining the exit of the user device 102 from the reduced access location 104, the method may proceed to 318, and external data may be requested to generate a response to the command in the queue based on the external data. In other implementations, in addition to or in place of adding a command to a queue, data to execute the command may be received via the network while the user device 102 is within the reduced access location 104. For example, while within the reduced access location 104, the user device 102 may begin to receive data using the limited bandwidth available within the reduced access location 104, and if the user device 102 exits the reduced access location 104 prior to completion of the command, receipt of data may be initiated or continued when outside of the reduced access location 104. If data sufficient to execute the command is received while the user device 102 is in the reduced access location 104, a response to the command may be generated based on the data received while within the reduced access location 104. In still other implementations, one or more rules may determine the particular functions performed by the user device 102, and in some cases, executable code to enable performance of certain functions while the user device 102 is in a reduced access location 104 may be received. For example, one or more rules may be provided to the user device 102 based on the authentication state of the user device 102, a browsing history associated with the user device 102, or one or more other characteristics of the user device 102. A user device 102 may be provided with executable code to enable use of an application to purchase an item. Continuing the example, a content server 130 or other computing device may provide approval rules or other types of code to the user device 102 prior to entry of the user device 102 into the reduced access location 104 to enable the user device 102 to approve a transaction using various payment instruments within a certain limit or based on certain categories of items. In some cases, the user device 102 may provide a request to a payment processor or similar computing device prior to entry of the user device 102 within the reduced access location 104 to determine such limits.

Figure 4:
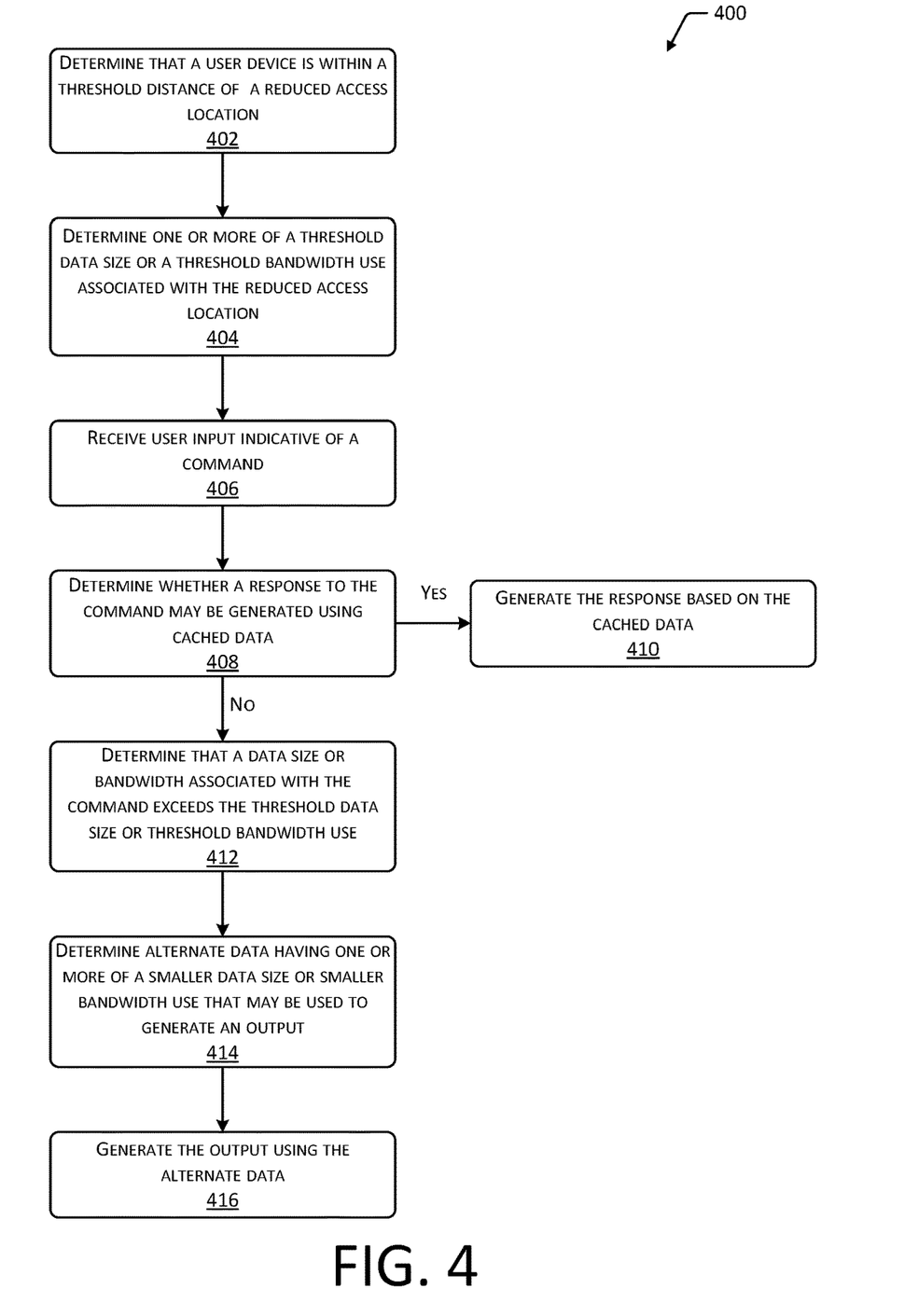
FIG. 4 is a flow diagram illustrating a method for controlling the data sent and received by a user device based on the bandwidth associated with a reduced access location.

FIG. 4 is a flow diagram 400 illustrating a method for controlling the data sent and received by a user device 102 based on the bandwidth associated with a reduced access location 104. At 402, a determination may be made that a user device 102 is within a threshold distance of a reduced access location 104. For example, a location of the user device 102 may be determined using GPS receiver or similar location sensor, while the location of one or more reduced access locations 104 may be stored as location data 112. Based on the location of the user device 102 relative to the reduced access location 104, a distance 110 between the user device 102 and reduced access location 104 may be determined and compared to a threshold distance. In some implementations, the threshold distance may be zero, and at 402, the user device 102 may be determined to be within the reduced access location 104. In other implementations, the threshold distance may be greater than zero, and the user device 102 may be determined to be proximate to but not necessarily within the reduced access location 104.

At 404, one or more of a threshold data size or a threshold bandwidth use associated with the reduced access location 104 may be determined. For example, network access while within the reduced access location 104 may be limited to a lower data transfer rate or subjected to higher latency or lower reliability when compared to other locations. As a result, transmission of large files or performing functions that use a high data transfer rate, such as streaming high-resolution video data, may not be possible within the reduced access location 104 or may be subject to poor latency and reliability. Based on the available bandwidth in a reduced access location 104, a threshold data size or bandwidth use may be determined. In other implementations, the threshold data size or bandwidth use may be a fixed amount common to multiple reduced access locations 104, independent of the characteristics of a particular reduced access location 104.

At 406, user input indicative of a command may be received. For example, the user input may request to access or modify a data record, receive or transmit data, generate a particular output, and so forth. At 408, a determination may be made as to whether a response to the command may be generated using cached data 106. For example, if an output may be generated responsive to a command using data stored in a cache associated with the user device 102 without accessing external sources of data via the network, then the method may proceed to 410, which may generate a response based on the cached data 106. If a response may not be generated using the cached data, the method may instead proceed to 412.

At 412, a determination may be made that a data size or bandwidth associated with the command exceeds the threshold data size or threshold bandwidth use determined at 404. For example, if an output responsive to the command may be produced by receiving a file from a content server 130 that has a data size greater than the threshold data size, or by performing a function that uses a data transfer rate in excess of the threshold bandwidth use, the method may proceed to 414. However, if the output may be produced without exceeding the threshold data size or bandwidth use, the output may instead be produced using external data received via the network.

At 414, alternate data that may be used to generate an output may be determined. The alternate data may have one or more of a smaller data size or smaller bandwidth use when compared to the data associated with the command. For example, if the data associated with the command includes high resolution video data, the alternate data may include lower resolution video data, image data, audio data, or alphanumeric data descriptive of the content of the video data. If the data associated with the command includes high resolution image data, the alternate data may include lower resolution image data, or alphanumeric data descriptive of the content of the image data. If the data associated with the command includes e-mail or other types of messages, the alternate data may include header information or other types of information indicative of the message(s), rather than the full message(s). In some implementations, responsive to user input selecting a particular header or other data associated with a particular message, the particular message may be received via the network and used to generate an output.

At 416, an output may be generated using the alternate data. In some implementations, the alternate data may be stored in a cache associated with the user device 102. In other implementations, the alternate data may be received via the network, but may utilize a smaller quantity of bandwidth than the data associated with the command.

Figure 5:
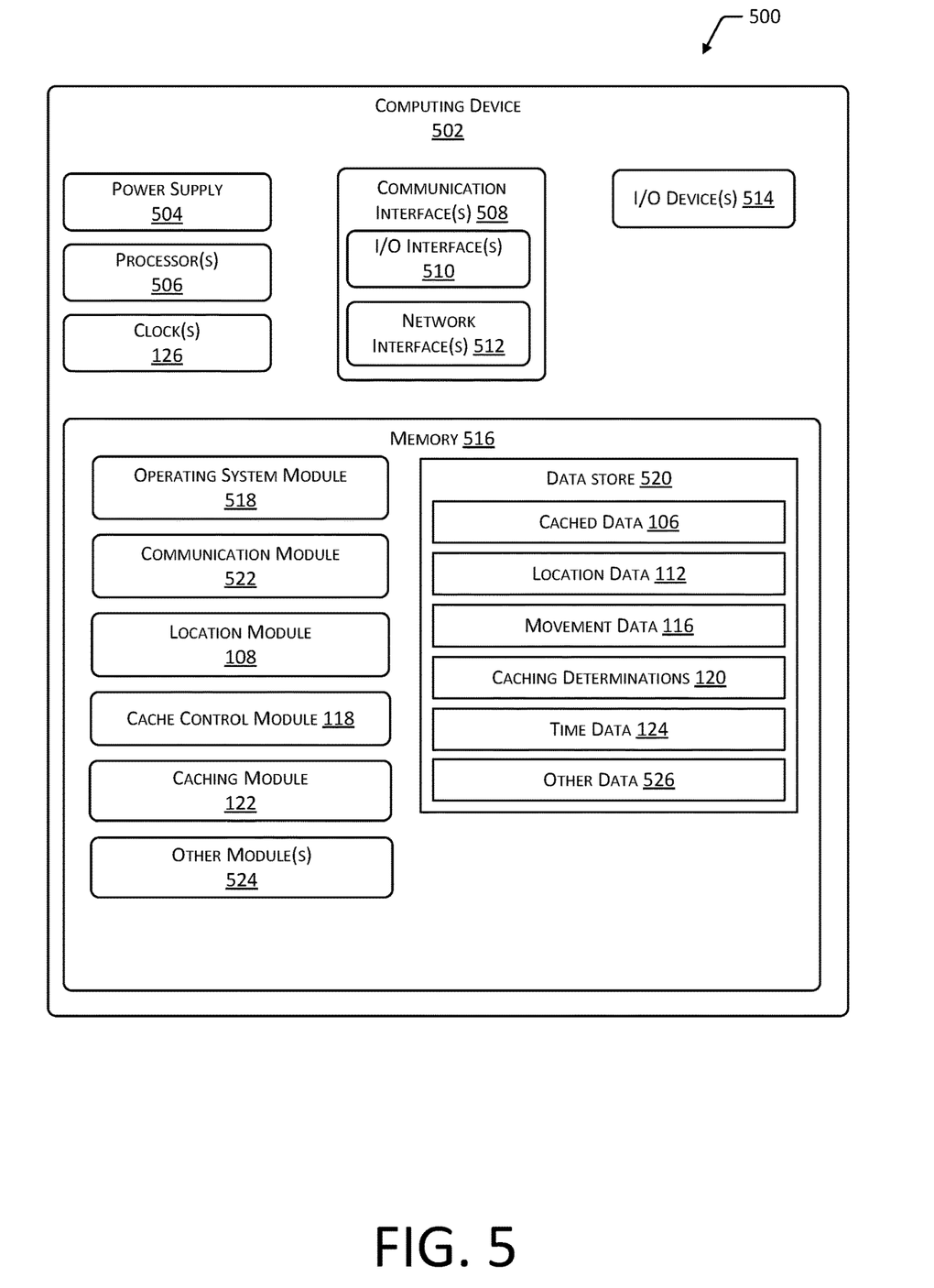
FIG. 5 is a block diagram illustrating a computing device within the scope of the present disclosure.

FIG. 5 is a block diagram 500 illustrating a computing device 502 within the scope of the present disclosure. The computing device 502 may include one or more user devices 102, content servers 130, or any other type of computing device 502 in communication with a user device 102. While FIG. 5 depicts a single computing device 502, in other implementations, the functions described with regard to the computing device 502 may be performed by any number and any type of computing devices 502. For example, a portion of the functions described herein may be performed by a user device 102 while other functions are performed by a content server 130 or other computing device 502 in communication with the user device 102. In other cases, all of the functions described herein may be performed by a single computing device 502 or distributed group of computing devices 502.

One or more power supplies 504 may be configured to provide electrical power suitable for operating the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clocks 126 may provide information indicative of date, time, ticks, and so forth. For example, the processor(s) 506 may use data from the clock 126 to generate a timestamp, trigger a preprogrammed action, determine when particular lengths of time have lapsed or particular times have occurred, and so forth.

The computing device 502 may include one or more communication interface(s) 508, such as input/output (I/O) interface(s) 510, network interface(s) 512, and so forth. The communication interfaces 508 may enable the computing device 502, or components of the computing device 502, to communicate with other computing devices 502 or components thereof. The I/O interface(s) 510 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O device(s) 514. The I/O devices 514 may include any manner of input device or output device associated with the computing device 502 or with another computing device 502 in communication therewith. For example, I/O devices 514 may include touch sensors, keyboards, mouse devices, microphones, image sensors (e.g., cameras), scanners, displays, speakers, haptic devices, printers, motion sensors, location sensors, and so forth. In some implementations, the I/O device(s) 514 may be physically incorporated with a computing device 502 or may be externally placed.

The network interface(s) 512 may be configured to provide communications between the computing device 502 and other devices, such as the I/O devices 514, routers, access points, and so forth. The network interface(s) 512 may include devices configured to couple to one or more networks, including local area networks (LANs), wireless LANs, wide area networks (WANs), wireless WANs, and so forth. For example, the network interfaces 512 may include computing devices 502 compatible with Ethernet, Wi-Fi, Wi-Fi Direct, Bluetooth, Bluetooth Low Energy, ZigBee, Z-Wave, 3G, 4G, LTE, and so forth.

The computing device 502 may include one or more busses or other internal communications hardware or software that allows for the transfer of data between the various modules and portions of the computing device 502.

As shown in FIG. 5, the computing device 502 may include one or more memories 516. The memory 516 may include one or more computer-readable storage media (CRSM). The CRSM may be any one or more of an electronic storage medium, a magnetic storage medium, an optical storage medium, a quantum storage medium, a mechanical computer storage medium, and so forth. The memory 516 may provide storage of computer-readable instructions, data structures, program modules, and other data for the operation of the computing device 502. A few example modules are shown stored in the memory 516, although the same functionality may alternatively be implemented in hardware, firmware, or as a system on a chip (SoC).

The memory 516 may include one or more operating system (OS) modules 518. The OS module 518 may be configured to manage hardware resource devices such as the I/O interfaces 510, the network interfaces 512, the I/O devices 514, and to provide various services to applications or modules executing on the processor(s) 506. The OS module 518 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 520 and one or more of the following modules may also be stored in the memory 516. The modules may be executed as foreground applications, background tasks, daemons, and so forth. The data store 520 may use a flat file, database, linked list, tree, executable code, script, or other data structure to store information. In some implementations, the data store 520 or a portion of the data store 520 may be distributed across one or more other devices including other computing devices 502, network attached storage devices, and so forth.

A communication module 522 stored in the memory 516 may be configured to establish communications with other computing devices 502.

The memory 516 may also store the location module 108. The location module 108 may determine a location of the computing device 502 and generate location data 112 indicative thereof. The location module 108 may also access location data 112 indicative of the locations of other computing devices 502, reduced access regions 104, and so forth, and may determine a distance 110 between the computing device 502 and the other locations. In some implementations, the location module 108 may also determine movement data 116 indicative of movement 114 of the computing device 502. Movement 114 of the computing device 502 may be measured using one or more motion sensors, or based on a rate of change of a location of the computing device 502.

The memory 516 may additionally store the cache control module 118. The cache control module 118 may access cached data 106 stored in association with the computing device 502 and generate caching determinations 120 indicative of a length of time until one or more portions of the cached data 106 expire or a length of time used to replace one or more portions of the cached data 106. For example, based on time data 124 indicative of a current time, the cache control module 118 may determine a length of time until particular cached data 106 expires. Based on a current data transfer rate associated with a network in communication with the computing device 502 and a data size associated with a portion of the cached data 106, a length of time used to replace the portion of the cached data 106 may be determined.

The cache control module 118 may also determine lengths of time until a computing device 502 reaches a reduced access location 104 or other location, and lengths of time that a computing device 502 may remain within a reduced access location 104 or other location. For example, based on movement data 116 indicative of a velocity of the computing device 502 and location data 112 indicative of a distance 110 between the computing device 502 and another location, a length of time until the computing device 502 reaches the location may be determined. Based on location data 112 indicative of a dimension (e.g., a length) of a reduced access location 104 or other location, and movement data 116 indicative of a velocity of the computing device 502, a length of time that the computing device 502 will remain within the location may be determined.

The memory 516 may additionally store the caching module 122. The caching module 122 may determine, based on the caching determinations 120, a time to replace one or more portions of the cached data 106. For example, caching module 122 may determine that one or more portions of the cached data 106 will expire during a time that the computing device 502 is within a reduced access location 104 and may cause the computing device 502 to request and receive replacement cached data 106 prior to the computing device 502 reaching the reduced access location 104. The caching module 122 may also determine a specific time that replacement of one or more portions of the cached data 106 may be initiated so that the replacement is completed prior to the computing device 502 reaching the reduced access location 104. The caching module 122 may also determine which portions of the cached data 106 are to be replaced based on the expiration times or usage thereof.

Other modules 524 may also be present in the memory 516. For example, other modules 524 may include user interface modules for receiving user input, such as commands to control one or more configurations or settings, encryption modules to encrypt and decrypt communications between computing devices 502, modules to measure network parameters such as latency, error rates, physical data rates, data throughput values, and so forth.

Other data 526 within the data store 520 may include default configurations and settings associated with computing devices 502, security data, such as encryption keys and schema, access credentials, threshold data such as threshold bandwidth values and threshold data sizes, usage data indicative of the frequency, length of time, or number of times particular cached data 106 has been used, and so forth.

In different implementations, different computing devices 502 may have different capabilities or capacities. For example, content servers 130 may have significantly more processor 506 capability and memory 516 capacity compared to the processor 506 capability and memory 516 capacity of user devices 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories associated storing computer-executable instructions;
one or more hardware processors to execute the computer-executable instructions to:
determine movement of a user device in communication with a network toward a location that is inaccessible via the network;
determine a first length of time prior to expiration of first data in a cache of the user device;
determine, based on the movement of the user device, a second length of time for the user device to reach the location;
determine that the first length of time is within a threshold length of the second length of time; and
in response to the first length of time being within the threshold length of the second length of time, cause the user device to receive second data to replace at least a portion of the first data in the cache.

2. The system of claim 1, further comprising computer-executable instructions to:
determine, based on the movement of the user device, a third length of time for the user device to remain in the location; and
determine a portion of the first data having an expiration time included within the third length of time;
wherein the at least a portion of the first data that is replaced by the second data includes the portion of the first data having the expiration time included within the third length of time.

3. The system of claim 1, further comprising computer-executable instructions to:
determine a first expiration time associated with a first portion of the first data;
determine a second expiration time associated with a second portion of the first data;
determine that the first expiration time is prior to the second expiration time; and
in response to the first expiration time being prior to the second expiration time, cause the user device to replace the first portion prior to the second portion.

4. The system of claim 1, further comprising computer-executable instructions to:
determine first usage data associated with a first portion of the first data;
determine second usage data associated with a second portion of the first data;
determine that the first usage data indicates greater access to the first portion by the user device than the second portion; and
in response to the first usage data indicating greater access than the second usage data, cause the user device to replace the first portion prior to the second portion.

5. A method comprising:
determining a first location of a user device, wherein the user device is in communication with a network;
determining that the first location is within one or more of a threshold distance or a threshold length of time of a second location associated with reduced access to the network;
determining movement of the user device;
determining, based on the movement, a first length of time for the user device to remain within the second location; and
in response to the first location of the user device and the first length of time, causing the user device to replace at least a portion of first data stored in a cache with second data.

6. The method of claim 5, further comprising:
determining that the at least a portion of the first data is associated with one or more expiration times included within the first length of time;
wherein the at least a portion of the first data is replaced in response to the one or more expiration times.

7. The method of claim 5, further comprising:
determining, based on the movement, a second length of time for the user device to reach the second location;
determining a third length of time for the user device to replace the at least a portion of the first data in the cache; and
determining that the third length of time is within a threshold length of the second length of time;

wherein the at least a portion of the first data is replaced further in response to the third length of time.

8. The method of claim 5, further comprising:
determining that one or more first expiration dates associated with the at least a portion of the first data are prior to a threshold expiration date; and
replacing the at least a portion of the first data in the cache prior to replacing at least one additional portion of the first data.

9. The method of claim 5, further comprising:
determining usage data associated with the at least a portion of the first data, wherein the usage data indicates one or more of:
  a greater count of accesses to the at least a portion of the first data than to an additional portion of the first data;
  a greater frequency of accesses to the at least a portion of the first data than to the additional portion of the first data; or
  a greater length of time of accesses to the at least a portion of the first data than to the additional portion of the first data; and
in response to the usage data, replacing the at least a portion of the first data in the cache prior to replacing the additional portion.

10. The method of claim 5, further comprising:
determining entry of the user device into the second location;
receiving a request to transmit a first type of data associated with a first bandwidth usage between the user device and a computing device;
determining that the first bandwidth usage exceeds a threshold bandwidth usage associated with the reduced access to the network; and
in response to the first bandwidth usage, transmitting a second type of data associated with a second bandwidth usage, wherein the second bandwidth usage is less than the first bandwidth usage.

11. The method of claim 10, wherein the first type of data includes one or more messages and the second type of data includes one or more headers associated with the one or more messages, the method further comprising:
providing the one or more headers to the user device;
receiving user input from the user device indicative of an individual header of the one or more headers;
determining an individual message of the one or more messages that corresponds to the individual header; and
providing the individual message to the user device.

12. The method of claim 5, further comprising:
determining usage data associated with the at least a portion of the first data, wherein the usage data indicates access to the at least a portion of the first data; and
determining additional data related to the at least a portion of the first data, wherein the additional data differs from the first data;
wherein the second data includes the additional data.

13. The method of claim 5, further comprising:
determining entry of the user device into the second location;
receiving a command from the user device;
determining that a bandwidth usage associated with the command exceeds a threshold bandwidth usage;
adding the command to a queue;
determining that the user device has exited the second location; and
executing the command.

14. A system comprising:
one or more memories storing computer-executable instructions;
one or more hardware processors to execute the computer-executable instructions to:
  determine that a user device associated with a network is within one or more of a threshold distance or a threshold length of time of a location associated with reduced network access;
  replace at least a portion of first data stored in a cache associated with the user device with second data, wherein the first data has a first expiration time prior to a second expiration time associated with the second data;
  determine entry of the user device into the location;
  receive a command from the user device;
  determine that the command is associated with one or more of: a threshold command type or a threshold bandwidth amount; and
  in response to the command being associated with the one or more of the threshold command type or the threshold bandwidth amount, one or more of: delay performance of the command or prevent performance of the command.

15. The system of claim 14, wherein the location includes one or more of an untrusted location, an untrusted computing device, or an absence of one or more security features, the system further comprising computer-executable instructions to:
determine a response to the command based on the second data in the cache; and
provide the response to the user device.

16. The system of claim 14, wherein the location includes one or more of an untrusted location, an untrusted computing device, or an absence of one or more security features, the system further comprising computer-executable instructions to:
add the command to a queue;
determine that the user device has exited the location; and
provide data responsive to the command to the user device via the network.

17. The system of claim 14, further comprising computer-executable instructions to:
add the command to a queue;
determine exit of the user device from the location; and
execute the command subsequent to the exit of the user device.

18. The system of claim 17, further comprising computer-executable instructions to:
in response to the exit of the user device from the location, provide a request to the user device, wherein the request is indicative of the command in the queue; and
receive user input indicative of the command.

19. The system of claim 14, further comprising computer-executable instructions to:
disable use of one or more commands associated with the user device in response to the entry of the user device within the location.

20. The system of claim 14, further comprising computer-executable instructions to:
determine a length of time associated with presence of the user device within the location; and
determine that the at least a portion of the first data is associated with one or more expiration times within the length of time;
wherein the at least a portion of the first data is replaced in response to the one or more expiration times being within the length of time.

21. A method comprising:
    determining a first location of a user device in communication with a network;
    determining that the first location is within one or more of a threshold distance or a threshold length of time of a second location associated with reduced access to the network;
    determining usage data associated with at least a portion of first data stored in a cache of the user device, wherein the usage data indicates one or more of:
        a greater count of accesses to the at least a portion of the first data than to an additional portion of the first data;
        a greater frequency of accesses to the at least a portion of the first data than to the additional portion of the first data; or
        a greater length of time of accesses to the at least a portion of the first data than to the additional portion of the first data; and
    in response to the first location of the user device and the usage data, causing the user device to replace the at least a portion of the first data in the cache with second data prior to replacing the additional portion.

* * * * *

UNITED STATES PATENT AND TRADEMARK OFFICE
CERTIFICATE OF CORRECTION

PATENT NO. : 10,645,188 B1
APPLICATION NO. : 15/841804
DATED : May 5, 2020
INVENTOR(S) : Abinash Mahapatra et al.

Page 1 of 1

It is certified that error appears in the above-identified patent and that said Letters Patent is hereby corrected as shown below:

In the Claims

Column 15, Claim 1, Line 54:
Currently Reads: one or more memories associated storing computer-executable instructions;
Where it should read: --one or more memories storing computer-executable instructions;--

Signed and Sealed this
Seventh Day of July, 2020

Andrei Iancu
*Director of the United States Patent and Trademark Office*